US007619853B2

(12) United States Patent
Hayakawa et al.

(10) Patent No.: US 7,619,853 B2
(45) Date of Patent: Nov. 17, 2009

(54) MAGNETIC DISK DRIVE WITH MECHANISM FOR FIXING FLEXIBLE PRINTED CIRCUIT ASSEMBLY

(75) Inventors: Takako Hayakawa, Kanagawa (JP); Kouki Uefune, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 469 days.

(21) Appl. No.: 11/487,525

(22) Filed: Jul. 13, 2006

(65) Prior Publication Data
US 2007/0019322 A1 Jan. 25, 2007

(30) Foreign Application Priority Data
Jul. 19, 2005 (JP) ............... 2005-209250

(51) Int. Cl.
*G11B 33/12* (2006.01)
(52) U.S. Cl. .................................... 360/97.01
(58) Field of Classification Search .............. 360/97.01, 360/97.04, 97.08; 720/655
See application file for complete search history.

(56) References Cited
U.S. PATENT DOCUMENTS
6,025,973 A * 2/2000 Mizoshita et al. ......... 360/98.08

2003/0128461 A1 7/2003 Hirasaka et al.
2004/0070867 A1* 4/2004 Kudo et al. ............... 360/97.01
2005/0013038 A1* 1/2005 Abe ......................... 360/97.01
2005/0225894 A1* 10/2005 Pool et al. ................ 360/97.01
2006/0050429 A1* 3/2006 Gunderson et al. ....... 360/97.01
2006/0050431 A1* 3/2006 Byun et al. ............... 360/97.01

FOREIGN PATENT DOCUMENTS
JP 2000-339949 12/2000
JP 2002-109869 4/2002
JP 2003-308689 10/2003

* cited by examiner

*Primary Examiner*—Angel A. Castro
(74) *Attorney, Agent, or Firm*—Townsend and Townsend and Crew LLP; Patrick Duncan

(57) ABSTRACT

A magnetic disk drive is provided which can attain the reduction in size and thickness without deteriorating the sealing performance for a space defined by a base and a cover. In one embodiment, a cover member is fixed to a base member with fixing screws. An FPC assembly is formed with leg portions extending from respective appropriate positions toward the cover member. The edges of the leg portions are abutted against the cover member fixed to the base member. Further, a stress member is provided between the base member and the FPC assembly. When the cover member is fixed to the base member to urge the FPC assembly adjacent the stress member, the stress member collapses to induce stress from the stress member, whereby a frictional force is generated at abutment surfaces of the cover member and the leg portions, thus fixing the FPC assembly.

16 Claims, 6 Drawing Sheets

MAGNETIC DISK DRIVE WITH MECHANISM FOR FIXING FLEXIBLE PRINTED CIRCUIT ASSEMBLY

CROSS-REFERENCES TO RELATED APPLICATIONS

This application claims priority from Japanese Patent Application No. JP-2005-209205, filed Jul. 19, 2005, the entire disclosure of which is incorporated herein by reference.

BACKGROUND OF THE INVENTION

The present invention relates to magnetic disk drives and more particularly to a magnetic disk drive using an improved method for fixing a flexible printed circuit assembly.

Heretofore, magnetic disk drives have been used in various fields. Recently, small-sized magnetic disk drives mounted on portable music players and on small-sized mobile devices have been becoming popular. In such magnetic disk drives, a flexible printed circuit (hereinafter referred to as "FPC") is used for transfer of information to be read and/or written by a magnetic head.

FIG. 5 shows a layout example of an FPC used in a conventional magnetic disk drive and various components located near the FPC. In FIG. 5, a magnetic disk 12 is mounted to a base member 10 through a spindle motor (not shown). A magnetic head assembly 14 is mounted on the base member 10 and a magnetic head 16 for write and read of information to and from the magnetic disk 12 is provided at a front edge of the magnetic head assembly 14.

Signals of information which the magnetic head 16 writes to and reads from the magnetic disk 12 are exchanged with an external circuit with an FPC 20 coupled to an FPC assembly 22. The FPC assembly 22 is configured such that a metallic plate or the like is bonded to the FPC and a connector and other components are attached onto the FPC. The FPC assembly 22 is fixed to the base member 10 with screws 24.

For example, Patent Literature 1 (Japanese Patent Laid-open No. 8-106761) discloses an FPC assembly fixed to a base with screws.

BRIEF SUMMARY OF THE INVENTION

In the above prior art the screws 24 are used to fix the FPC assembly 22 to the base member 10. However, more reduced size and thickness of the magnetic disk drive sometimes cause interference between the screws 24 and the cover member fixed to the base member 10. In order to avoid such interference, the cover member is formed with holes at positions corresponding to the heads of the screw members 24, respectively. Consequently, there has arisen a problem in that the sealing performance for the space defined between the base member 10 and cover member of the magnetic disk drive may be deteriorated.

Moreover, to fix the FPC assembly 22 to the base member 10 with the screws 24, it is necessary that holes adapted to insert the screws 24 therethrough be formed in the FPC assembly 22. This poses another problem in that, when the magnetic disk drive is reduced in size and thickness, the holes greatly restrict the layout of an electronic circuit in the FPC assembly 22.

The present invention has been accomplished in view of the above-mentioned problems and it is a feature of the invention to provide a magnetic disk drive which can attain the reduction of size and thickness without deteriorating sealing performance for the space defined between the base and the cover.

According to an aspect of the present invention, a magnetic disk drive comprises a base member; a spindle motor installed on the base member; a magnetic disk adapted to be driven rotationally by the spindle motor to record information thereon; a magnetic head for read and write of information from and to the magnetic disk; a magnetic head assembly which positions the magnetic head; a cover member fixed to the base member to define a space adapted to receive therein the spindle motor, the magnetic disk, the magnetic head and the magnetic head assembly; a flexible printed circuit assembly disposed within the space so as to be urged by the cover member, the flexible printed circuit assembly transferring information to be read or written from or to the magnetic disk; and a stress member disposed between the base member and the flexible printed circuit assembly and adapted to induce stress against an urging pressure provided from the cover member.

In some embodiments, the flexible printed circuit assembly is abutted against the cover member through a leg portion extending toward the cover member.

According to the present invention, the flexible printed circuit assembly is disposed so as to be urged by the cover member. Stress against an urging pressure induced from the cover member is created by the stress member disposed between the base member and the flexible printed circuit assembly to fix the flexible printed circuit assembly. Therefore, it is not necessary to use screws and it is possible to attain the reduction in size and thickness of the magnetic disk drive without deteriorating the sealing performance for the space defined between the base and the cover.

DETAILED DESCRIPTION OF THE INVENTION

A specific embodiment for carrying out the present invention will be described below with reference to the drawings.

Figure 1:
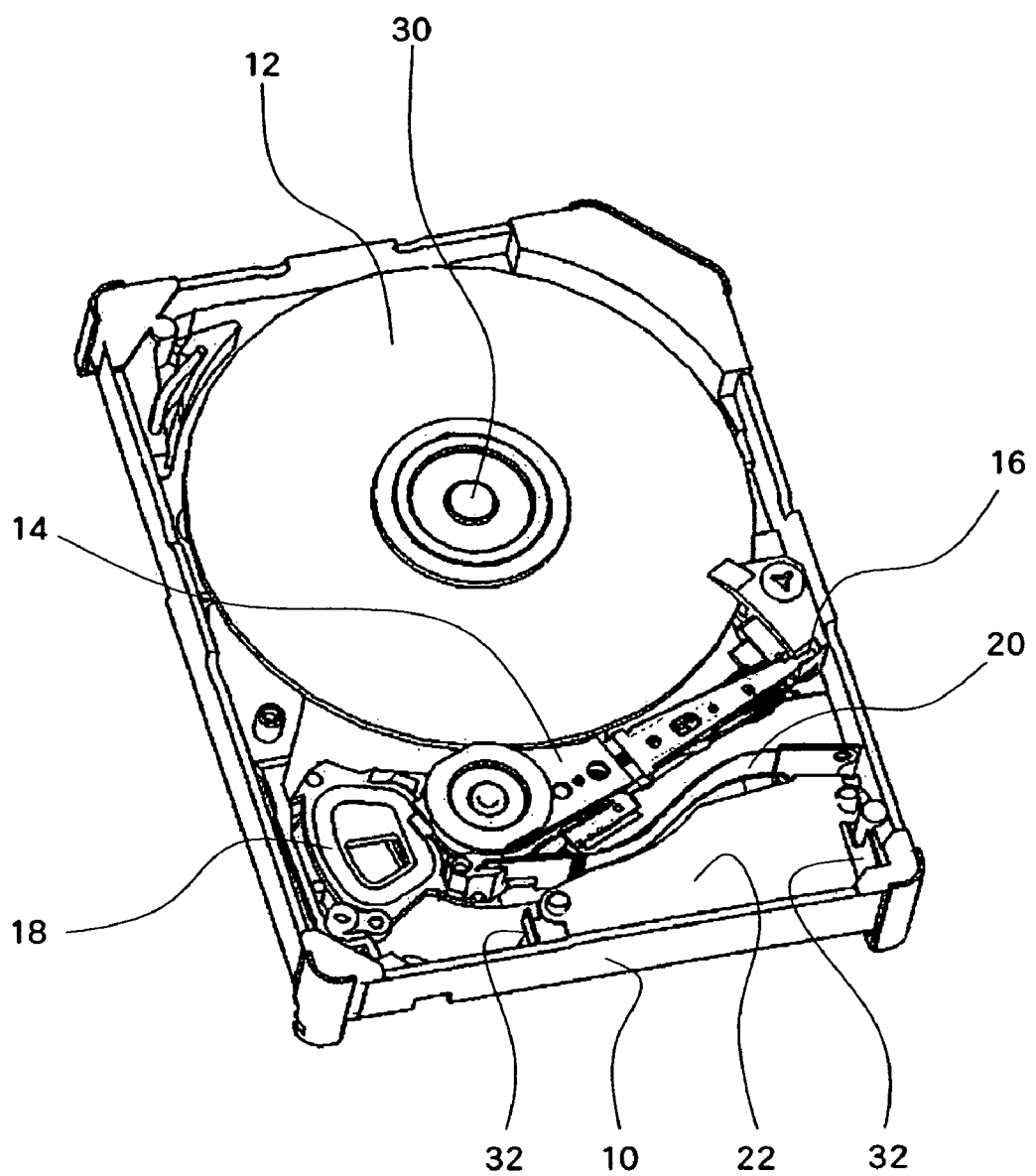
FIG. 1 illustrates a configuration example of a magnetic disk drive according to an embodiment of the present invention.

In FIG. 1 there is shown a configuration example of a magnetic disk drive according to an embodiment of the present invention. On a base member 10 is provided a magnetic disk 12 as an information recording medium which is rotationally driven by a spindle motor 30. A magnetic head assembly 14 is pivotably mounted to the base member 10 and a magnetic head 16 for read and write of information from and to the magnetic disk 12 is provided at a front edge of the magnetic head assembly 14. The magnetic head assembly 14 is pivoted radially of the magnetic disk 12 by means of a voice coil motor 18 to position the magnetic head 16.

Signals of information which the magnetic head 16 writes and reads from the magnetic disk 12 are exchanged with an external circuit with an FPC 20 coupled to an FPC assembly 22. The FPC assembly 22 is urged toward the base member 10 by means of a cover member (not shown) and is fixed with both this urging pressure and stress of a stress member (not shown) which is disposed on the base member 10. The details of how to fix the FPC assembly 22 will be described later.

Figure 2:
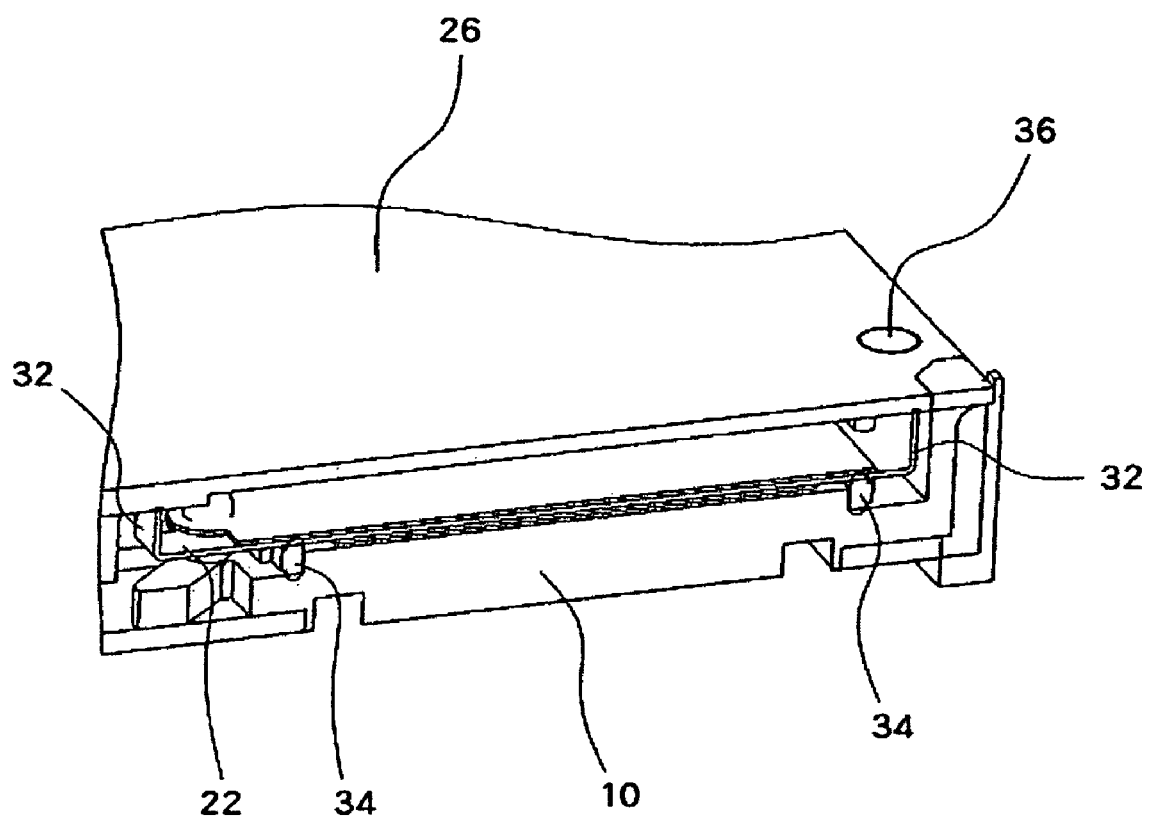
FIG. 2 is a partial sectional view of an FPC assembly and the vicinity thereof in the magnetic disk drive shown in FIG. 1.

FIG. 2 is a partial sectional view of the FPC assembly shown in FIG. 1 and the vicinity thereof. In FIG. 2, a cover member 26 is fixed to the base member 10 with fixing screws 36 to define a space therebetween adapted to receive therein the spindle motor 30, magnetic disk 12, magnetic head assembly 14, magnetic head 16, FPC 20 and FPC assembly 22.

The FPC assembly 22 is formed with leg portions 32 extending from respective appropriate positions toward the cover member 26. It is optional whether the leg portions 32 are to be formed by bending suitable end portions of the FPC assembly 22 toward the cover member 26 or by forming projections extending from respective appropriate positions toward the cover member 26. The leg portions 32 are formed so that their extreme ends are abutted against the cover member 26 fixed to the base member 10.

A stress member 34 is provided between the base member 10 and the FPC assembly 22. The stress member 34 may preferably use, e.g., fluorine rubber, EPDM (ethylene-propylene-diene rubber) or other materials having elasticity and sealing performance, but no limitation is made thereto. Metal or the like is also employable.

Figure 3:
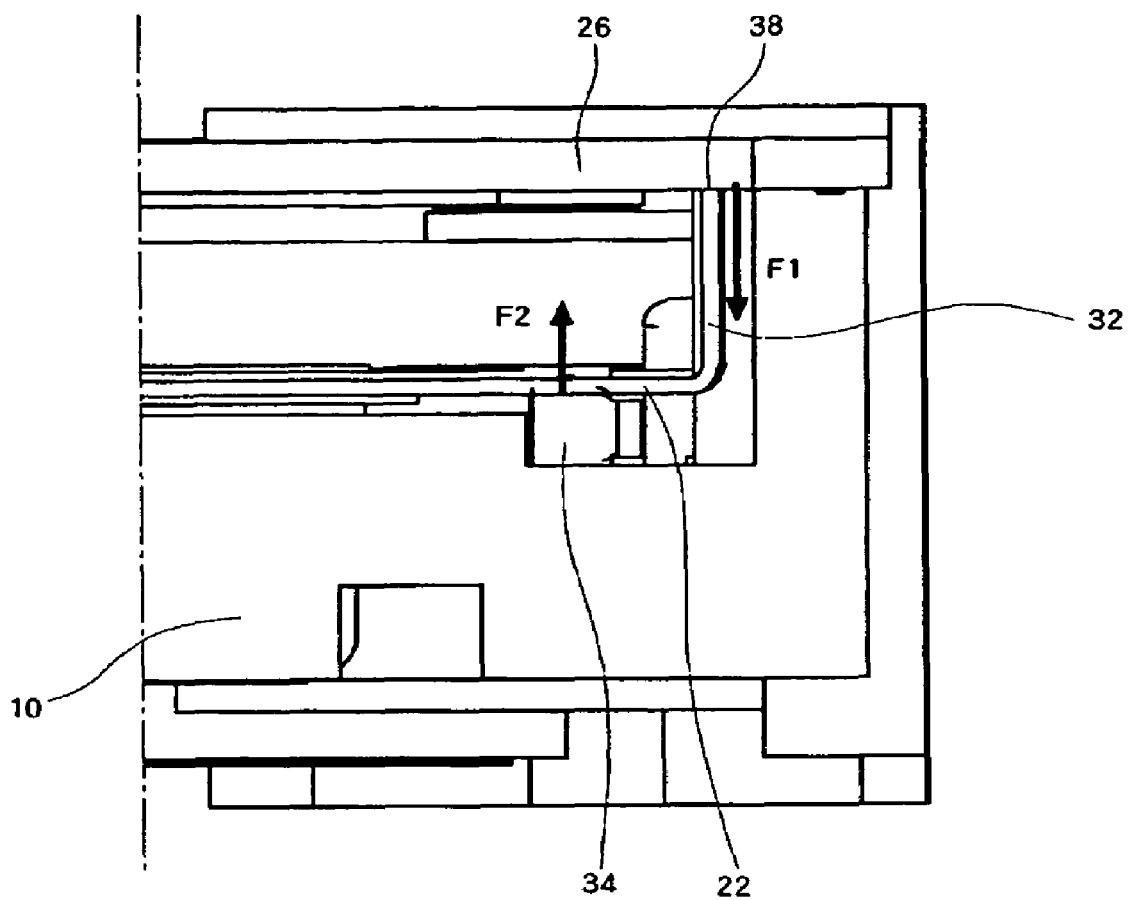
FIG. 3 illustrates how to fix the FPC assembly shown in FIG. 1.

FIG. 3 is a partial sectional view of the FPC assembly 22 and the vicinity thereof for explaining how to fix the FPC assembly 22. In FIG. 3, when the cover member 26 is fixed to the base member 10, the FPC assembly is urged through the leg portions 32 in abutment against the cover member 26. On the other hand, the stress member 34 is formed to a thickness greater than a gap defined between the base member 10 and the FPC assembly 22 when the cover member 26 is fixed to the base member 10. As a result, when the FPC assembly 22 is urged by the cover member 26, the stress member 34 collapses under the resulting urging pressure F1 and stress F2 is developed from the stress member 34 in a direction opposite to the urging pressure F1. With the urging pressure F1 and stress F2, the FPC assembly 22 is fixed in the vertical direction (directions of F1 and F2) in FIG. 3. Further, a frictional force is created at an abutment surface 38 between the cover member 26 and the leg portion 32, whereby the FPC assembly 22 is fixed also in the transverse direction in FIG. 3.

Thus, the FPC assembly 22 can be fixed without using screws, and it becomes unnecessary to form holes in the cover member 26 for avoidance of interference with screws, so that the deterioration in sealing performance of the space defined by the base member 10 and the cover member 26 can be prevented. Furthermore, since it is no longer required to form tapped holes in the FPC assembly 22, the restriction on the layout of the electronic circuit in the FPC assembly 22 can be diminished even when the size and thickness of the magnetic disk drive are reduced.

Figure 4:
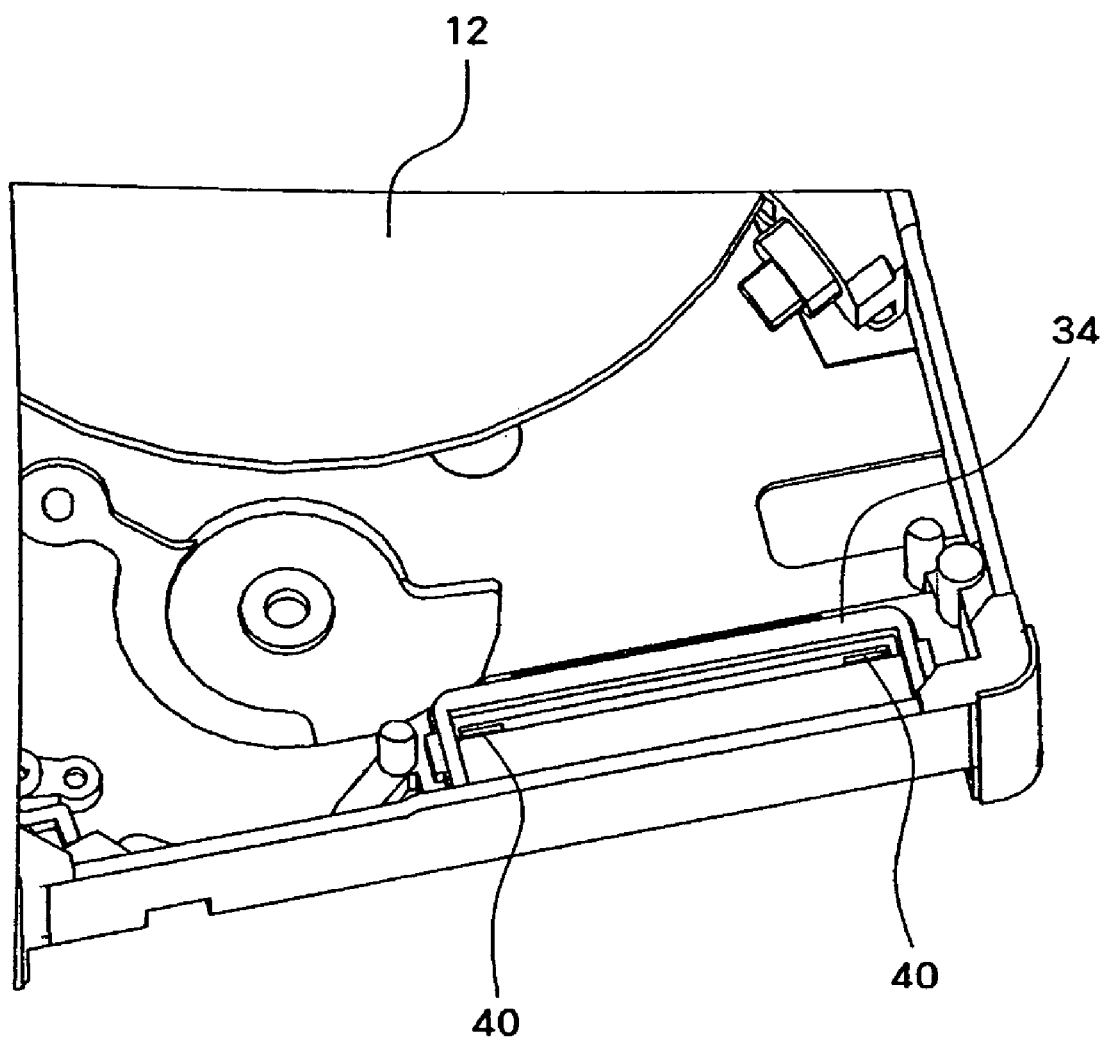
FIG. 4 is a partial perspective view showing an example of formation of a stress member.
Figure 5:
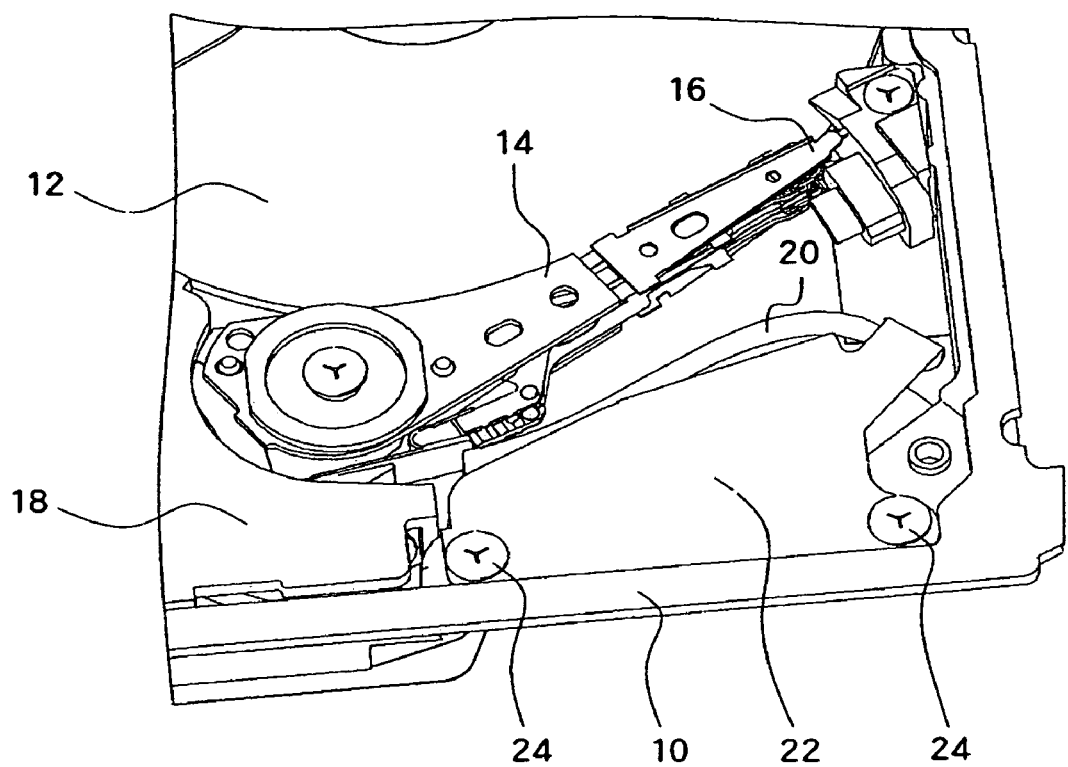
FIG. 5 illustrates a layout example of an FPC and various components disposed near the FPC in a conventional magnetic disk drive.
Figure 6:
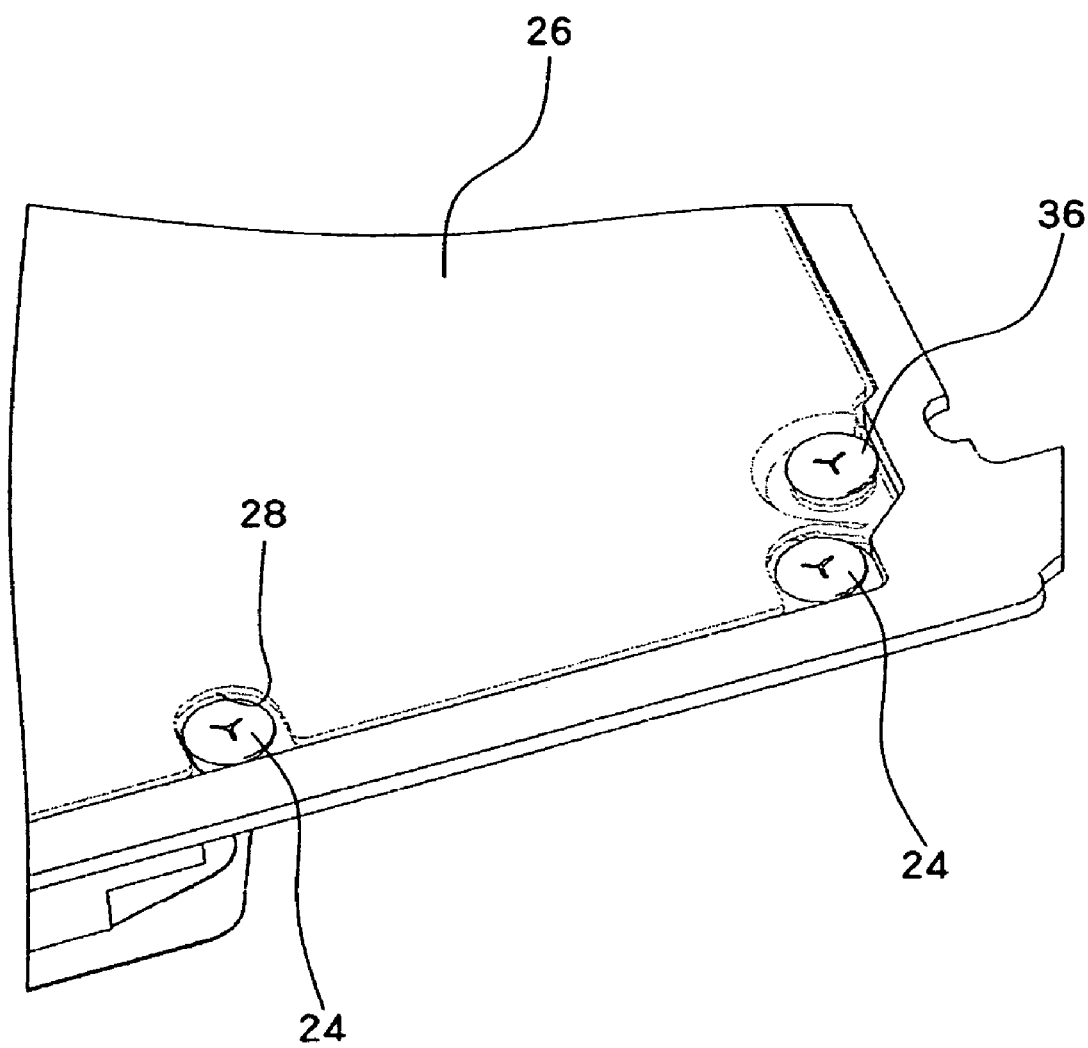
FIG. 6 is an explanatory diagram of a cover member formed with holes adapted to avoid interference with the FPC assembly-fixing screws in the prior art.

FIG. 4 is a partial perspective view showing an example of formation of the stress member 34. In FIG. 4, a signal transfer terminal formed in the FPC assembly 22 is drawn out to the exterior of the magnetic disk drive from a terminal hole 40 formed in the base member 10. The stress member 34 is formed so as to surround the terminal hole 40. As noted above, if the stress member 34 is formed of a material having sealing performance, it is possible to seal between the base member 10 and the FPC assembly 22 and hence to prevent the ingress of the outside air and dust from the terminal hole 40 into the magnetic disk drive.

Although in FIG. 4 the stress member 34 formed in a rectangle with one side open, the stress member 34 may be formed in a rectangle so as to surround the terminal hole 40.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A magnetic disk drive comprising:
    a base member;
    a spindle motor disposed on said base member;
    a magnetic disk adapted to be driven rotationally by said spindle motor to record information thereon;
    a magnetic head for read and write of information from and to said magnetic disk;
    a magnetic head assembly which positions said magnetic head;
    a cover member fixed to said base member to define a space to receive therein said spindle motor, said magnetic disk, said magnetic head and said magnetic head assembly;
    a flexible printed circuit assembly disposed within said space so as to be urged by said cover member, said flexible printed circuit assembly transferring information to be read or written from or to said magnetic disk; and
    a stress member disposed between said base member and said flexible printed circuit assembly and adapted to induce stress against an urging pressure provided from said cover member on said stress member whereby said flexible printed circuit assembly is fixed in both vertical and transverse directions.

2. A magnetic disk drive according to claim 1, wherein said flexible printed circuit assembly is abutted against said cover member through a leg portion extending toward said cover member.

3. A magnetic disk drive according to claim 1, wherein said stress member is a sealing member for sealing between said base member and said flexible printed circuit assembly.

4. A magnetic disk drive according to claim 3, wherein said flexible printed circuit assembly is abutted against said cover member through a leg portion extending toward said cover member.

5. A magnetic disk drive according to claim 1, wherein said stress member is formed of fluorine rubber or ethylene-propylene-diene rubber.

6. A magnetic disk drive according to claim 5, wherein said flexible printed circuit assembly is abutted against said cover member through a leg portion extending toward said cover member.

7. A magnetic disk drive comprising:
    a base member;
    a spindle motor disposed on said base member;
    a magnetic disk adapted to be driven rotationally by said spindle motor to record information thereon;
    a magnetic head for read and write of information from and to said magnetic disk;
    a magnetic head assembly which positions said magnetic head;

a cover member fixed to said base member to define a space to receive therein said spindle motor, said magnetic disk, said magnetic head and said magnetic head assembly;

a flexible printed circuit assembly disposed within said space so as to be urged by said cover member; and a stress member disposed between said base member and said flexible printed circuit assembly and having an initial size larger than a gap between said flexible printed circuit assembly and said base so as to be pressed between said flexible printed circuit assembly and said base to induce stress against an urging pressure provided from said cover member on said stress member through said flexible printed circuit assembly whereby said flexible printed circuit assembly is fixed in both vertical and transverse directions.

8. A magnetic disk drive according to claim 7, wherein said flexible printed circuit assembly is abutted against said cover member through a leg portion extending toward said cover member.

9. A magnetic disk drive according to claim 7, wherein said stress member is a sealing member for sealing between said base member and said flexible printed circuit assembly.

10. A magnetic disk drive according to claim 9, wherein said flexible printed circuit assembly is abutted against said cover member through a leg portion extending toward said cover member.

11. A magnetic disk drive according to claim 7, wherein said stress member is formed of fluorine rubber or ethylene-propylene-diene rubber.

12. A magnetic disk drive according to claim 11, wherein said flexible printed circuit assembly is abutted against said cover member through a leg portion extending toward said cover member.

13. A magnetic disk drive comprising:

a base member;

a spindle motor disposed on said base member;

a magnetic disk adapted to be driven rotationally by said spindle motor to record information thereon;

a magnetic head for read and write of information from and to said magnetic disk;

a magnetic head assembly which positions said magnetic head;

a cover member fixed to said base member to define a space to receive therein said spindle motor, said magnetic disk, said magnetic head and said magnetic head assembly;

a flexible printed circuit assembly disposed within said space so as to be urged by said cover member; and means, disposed between said base member and said flexible printed circuit assembly, for inducing stress against an urging pressure provided from said cover member through said flexible printed circuit assembly, so as to generated a frictional force between said cover member and said flexible printed circuit assembly whereby said flexible printed circuit assembly is fixed in both vertical and transverse directions.

14. A magnetic disk drive according to claim 13, wherein said flexible printed circuit assembly is abutted against said cover member through a leg portion extending toward said cover member, and wherein said frictional force is generated between an abutment surface between said cover member and said leg portion.

15. A magnetic disk drive according to claim 13, wherein said means forms a seal between said base member and said flexible printed circuit assembly.

16. A magnetic disk drive according to claim 15, wherein said flexible printed circuit assembly is abutted against said cover member through a leg portion extending toward said cover member, and wherein said frictional force is generated between an abutment surface between said cover member and said leg portion.

* * * * *